United States Patent
Steier et al.

(10) Patent No.: US 7,366,363 B2
(45) Date of Patent: Apr. 29, 2008

(54) LOW-VOLTAGE FLEXIBLE OPTIC POLYMER MODULATORS

(75) Inventors: William H. Steier, San Marino, CA (US); Hyun-Chae Song, Burbank, CA (US); Min-Cheol Oh, Busan (KR); Seh-Won Ahn, Seoul (KR)

(73) Assignee: University of Southern California, Los Angeles, CA (US)

( * ) Notice: Subject to any disclaimer, the term of this patent is extended or adjusted under 35 U.S.C. 154(b) by 169 days.

(21) Appl. No.: 11/112,870

(22) Filed: Apr. 21, 2005

(65) Prior Publication Data

US 2005/0249445 A1    Nov. 10, 2005

Related U.S. Application Data

(60) Provisional application No. 60/564,466, filed on Apr. 21, 2004.

(51) Int. Cl.
  *G02F 1/035* (2006.01)
  *G02F 1/295* (2006.01)
  *H01L 21/70* (2006.01)

(52) U.S. Cl. ............... 385/2; 385/8; 385/14; 385/129; 385/147; 438/31; 438/69

(58) Field of Classification Search ............ None
  See application file for complete search history.

(56) References Cited

U.S. PATENT DOCUMENTS

| | | | |
|---|---|---|---|
| 5,764,820 A * | 6/1998 | De Dobbelaere et al. | 385/14 |
| 6,669,801 B2 * | 12/2003 | Yoshimura et al. | 156/230 |
| 6,684,007 B2 * | 1/2004 | Yoshimura et al. | 385/31 |
| 7,054,052 B2 * | 5/2006 | Niklaus et al. | 359/291 |
| 7,058,245 B2 * | 6/2006 | Farahi | 385/14 |
| 2003/0108314 A1 * | 6/2003 | Park et al. | 385/123 |
| 2004/0224482 A1 * | 11/2004 | Kub et al. | 438/458 |
| 2005/0249445 A1 * | 11/2005 | Steier et al. | 385/3 |

OTHER PUBLICATIONS

Song et al. ("Flexible low-voltage electro-optic polymer modulators", Applied Physics Letters, vol. 82, No. 25, pp. 4432-4434, Jun. 23, 2003).*

* cited by examiner

*Primary Examiner*—Michelle Connelly-Cushwa
(74) *Attorney, Agent, or Firm*—Fish & Richardson P.C.

(57) ABSTRACT

An electro-optic modulator is formed from all flexible materials, to form a flexible electro-optic modulator. The formation process uses a photoresist which selectively adheres to one material more than it adheres to another material. This allows selective liftoff, where only parts of the substrate are lifted off. For example, this allows silicon ends on the modulator, thereby facilitating pig tailing and also facilitates handling. Another aspect describes testing the bending radius.

25 Claims, 3 Drawing Sheets

LIFT OFF

LOW-VOLTAGE FLEXIBLE OPTIC POLYMER MODULATORS

This application claims the benefit of U.S. Provisional Application No. 60/564,466, filed on Apr. 21, 2004, which is incorporated herein by reference.

BACKGROUND

High speed optical modulators may form a interface between wide bandwidth electronic data and an optical communication system. These devices may be used in any photonic system, including fiber communications, optically controlled antennas, and optical signal processing. These devices may have advantages of wide RF bandwidths, and low switching voltages. Also importantly, electro optic polymer devices may enjoy compatibility with a variety of substrates including Si, GaAs, and plastic.

Certain conventional modulators may be based on $LiNbO_3$ or other semiconductors. These materials are typically rigid crystalline materials. Devices made from these materials must be used in rigid packages. The devices must be stiff, and must remain stiff and flat during use.

A plastic substrate enables implementing a flexible device. The flexible device can be a flexible, guided wave high-speed optical modulator. The flexible optic waveguide device allows conforming to a curvilinear surface, thereby allowing the device to be placed on any antenna or an aircraft surface. This can also be used for optically controlled phased array antennas; for example antennas that can be unrolled after the satellite is already in orbit. The device can also be rolled up and unrolled while in use.

Previous systems have described poled electro-optic polymer films being lifted from a substrate, using a water-soluble layer. Other systems describe Mylar™ being used as a substrate for a flexible modulator, and inserted into W band rectangular microwave waveguides, to form a traveling wave modulator. The modulator is released from the fabrication substrate using a solvent to dissolve the adhesive.

Both of these approaches require a special adhesive to attach the flexible substrate to the fabrication substrate. That adhesive must be capable of dissolving later. The adhesive must also be capable of withstanding temperatures used in poling the polymer film. Moreover, new polymer materials have recently become available which have higher glass transition temperatures ($T_g$). These polymers are poled at higher temperatures, and stable at high temperatures. This provides even more difficulty in selecting adhesives and effective this formation process.

SUMMARY

The present disclosure describes a flexible low-voltage electro-optic polymer modulator, and a way of forming such a modulator. A technique is described that uses a photoresist material that has different adhesions to different materials. The photoresist is caused to adhere to one material, but adhere poorly to the other material. This allows liftoff of the one material without lifting of the other material.

A selectively adhering material is used as a photoresist, and a multiple layer polymer film is lifted off from a silicon substrate.

In an embodiment, SU-8 is used as the photoresist material. This material adheres well to Si, but adheres poorly to gold (Au). The difference between adhesion of gold to a polymer and a silicon surface is used to allow lift off of some materials but not others. This technique may be operable over a wide range of temperatures.

The formed device may be flexible within specified bending radii.

BRIEF DESCRIPTION OF THE DRAWINGS

These and other aspects will now be described in detail with reference to the accompanying drawings, wherein.

DETAILED DESCRIPTION

FIGS. 1A-1D shows operations of forming a flexible electro-optic device according to the present system. In summary, this is done by lifting off a multiple layer polymer film from a silicon substrate using a selective adhesion material. The polymer film is formed of a release layer of SU-8, a polymer substrate layer of UV-15, and cladding-core-cladding polymer modulator layers.

SU-8 is a commercially available photoresist which has an adhesion difference between a silicon layer and a Au metal surface. The SU-8 layer has very poor adhesion to an Au surface. It is therefore possible to use the interface between the Au/SU-8 as the release interface for liftoff process. In contrast, SU-8 has a good adhesion on a silicon surface.

This allows lifting off selected areas by patterning an Au coating on a silicon substrate. While the present disclosure describes SU-8 as the preferred material, there may be other photoresist and available polymers with difference in adhesion to metals and silicon or other materials, which can be used in place of the SU-8.

A thick film of the SU-8 polymer can be formed, and may serve as a substrate for the flexible EO device. However, baked thick films of SU-8 are relatively hard, and may be difficult to bend and/or dice without cracking. A second polymer layer may also be used to reduce the crack propensity.

Figure 1A:
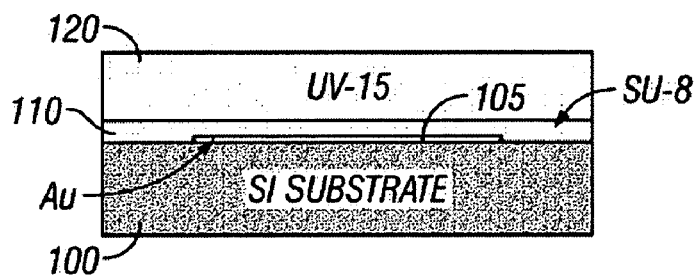
FIG. 1A-1D show formation steps for the device
Figure 1B:
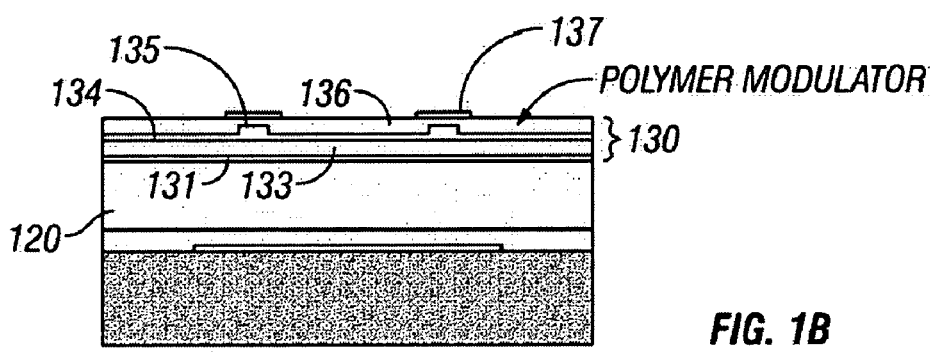

FIG. 1A shows the first step of the formation process in which a silicon substrate 100 is formed with an AU pattern 105 thereon; as a patterned substrate. A 3 µm thick layer of SU-8, layer 110, is coated over the patterned substrate. A UV curable epoxy, using the material UV 15, is then coated and cured in several layers, until its total thickness is around 100 µm, shown as layer 120. UV 15 is also used as the cladding material in an embodiment. UV 15 can withstand poling temperatures over 150° C.

The EO polymer modulator 130 is fabricated on top of the layer 120, using a standard fabrication procedure. A bottom electrode 131 is formed by vacuum evaporation of a layer of chromium with a thickness of 100 Angstroms, and then vacuum evaporation of a layer of gold with a thickness of 500 Angstroms. In the embodiment, UV 15 is spin coated to a thickness of 3µ as the lower cladding 133. A guest host EO polymer, CLD-1-APC is used as a 2.2µ core layer 134.

Mach Zehnder waveguide patterns which may be, for example, 4 µm in width, are formed using standard photolithography. Reactive ion etching in oxygen is then carried out to form a rib height of 0.6 µm. A 3.2 µm upper cladding layer 136 is formed of UFC170A. Au poling electrodes 137 of 500 angstroms and lengths of 20 mm are fabricated on the cladding using vacuum evaporation, standard photolithography, and wet etching.

The push pull operation of the Mach Zehnder modulator is carried out by poling the two arms of the modulator in opposite directions. Each arm is poled by applying a voltage of 400 vots at 145° C. in a nitrogen atmosphere.

Figure 1C:
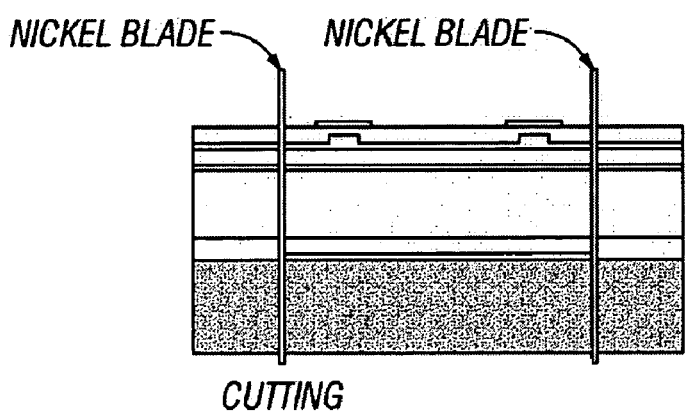

The edge of the wafer is then diced in FIG. 1C, using for example a nickel blade.

Figure 1D:
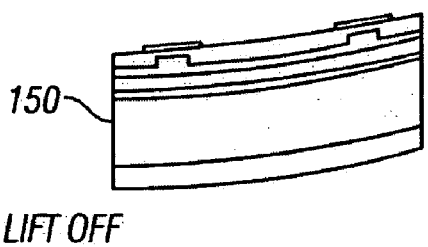

FIG. 1D shows the modulator and support (UV-15 layer 120 and SU-8 layer 110) being lifted off from the SU-8/gold interface.

The flexible device 150 is shown in cross section in FIG. 1D.

Figure 2A:
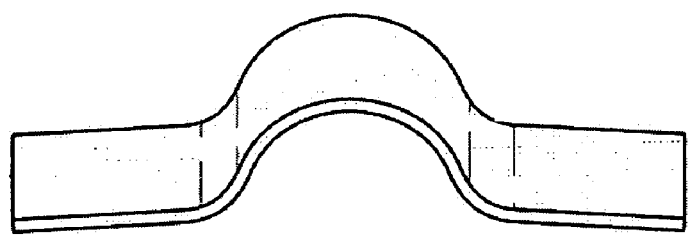
FIGS. 2A-2C show the device itself, and its flexing.
Figure 2B:
Figure 2C:
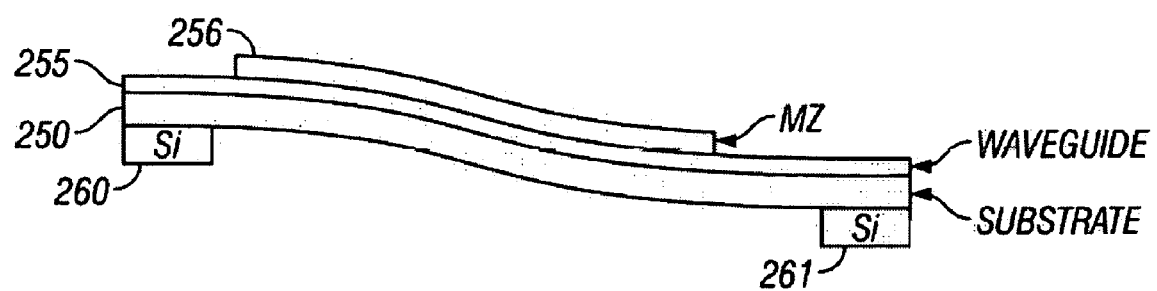

FIGS. 2A and 2B show the fabricated electro optical polymer devices, and their degree of flexibility. FIG. 2C shows a cross-section, showing the substrate, 250, the waveguide 255, including the Mach Zehnder portion 256, and silicon pads, 260 and 261 at the respective ends. Importantly, because of the above-described difference in adhesion of SU-8, it is possible to leave these silicon pads at each end of the flexible modulator. This may facilitate pigtailing and handling of the device.

A test of the device may couple TM polarized light, 1550 nm, to the device, through the single mode fiber. The output light is then collected by an objective lens and focused on to a photo detector. This produces a so-called half wave voltage and extinction ratio, measured by applying a 1 kHz signal and a triangular waveform. The measured half wave voltage is around 2.6 V, which corresponds to an $R_{33}$ of about 30 pm/V, and the extinction ratio of the modulator has been measured to be better than 20 dB. These results are essentially the same as those obtained from optic polymer devices on conventional silicon substrates. That is, using this technique, there is no device performance degradation from the flexible substrate.

Another aspect is a determination of how much the device can be bent before its performance is affected. The insertion loss may depend on the bending radius, for example. More bending may cause the waveguides to begin to radiate into the substrate. Bending may also cause the material to crack. In addition, stresses that are induced by the bending may change $V_\pi$, the extinction ratio, and the bias point.

Figure 3:
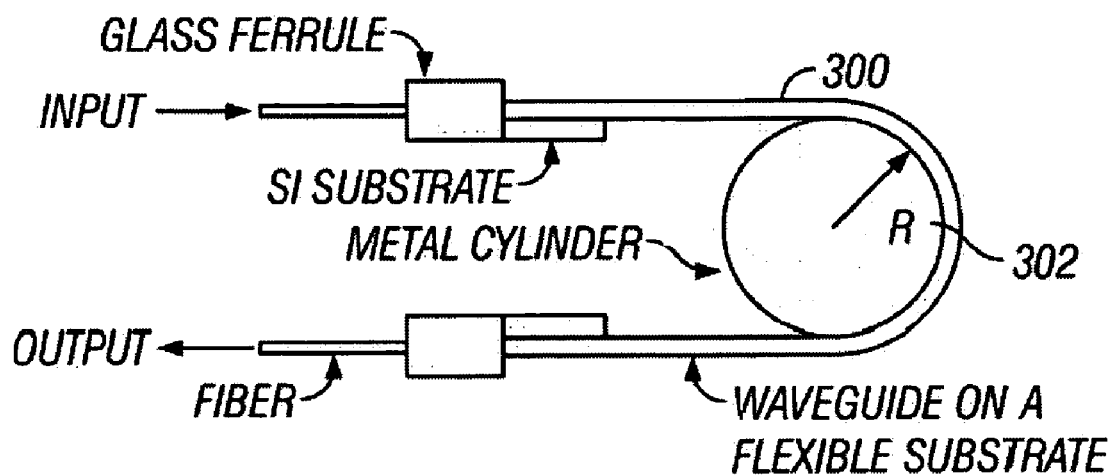
FIGS. 3 and 4 show results of a bending test.
Figure 4:
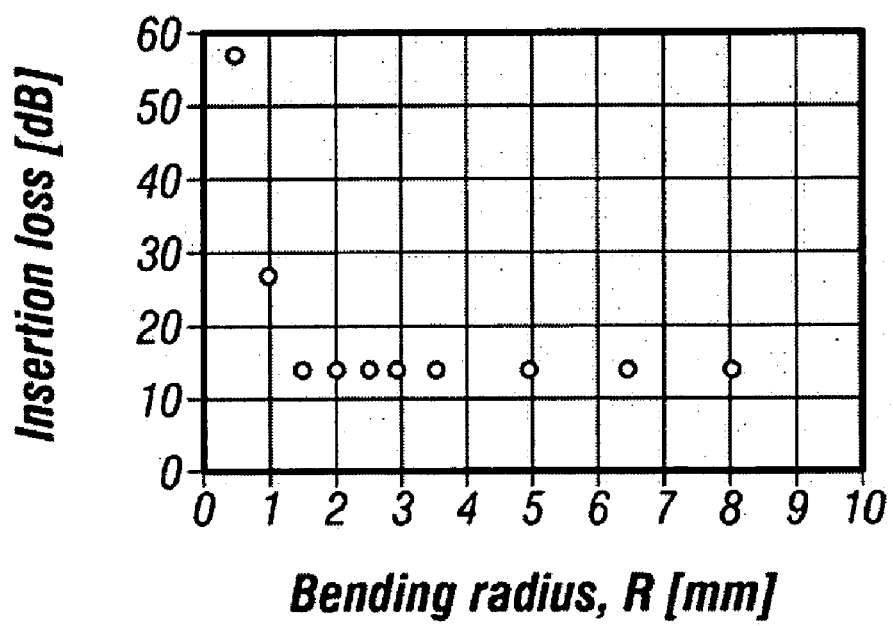

In order to analyze the maximum bending ratio, the set up of FIG. 3 may be used. The flexible waveguide 300 is bent around a cylinder 302. The cylinder may have a variable radius, or a number of different cylinders of different radii can be used. The insertion loss is then measured. FIG. 4 shows a graph of insertion loss as a function of bending radius. This may be used to determine the maximum bending radius of such a system.

In the embodiment, there may be a large refractive index difference between the core and the clad, e.g. the refractive index difference may be around 7%. Because of this, insertion loss is not increased until the bending radius reduces to around 1.5 mm. repeated bending of the waveguides does not appear to change the characteristics.

Another test system measured changes in $V_\pi$, extinction ratio, and bias point. The flexible modulator is fiber pigtailed at both ends using the epoxy and quartz plates to support the fiber. This forms a 35 mm long middle part between the plates. This middle part is flexible. The quartz plates are then mounted on independent stages, on the modulator is flexed by moving the plates together.

FIG. 2a shows how the modulator is flexed. The bending radius is calculated from the amount of plate movement by an S bend approximation. It was found that VΠ and the extinction ratio remained unchanged down to the lowest possible of bending radius that could be measured, here 5 mm.

However, there was observed a repeatable shift in the modulator bias point as a function of the bending radius. The modulator has no DC bias voltage, so the bias point is set by the path length difference between the two arms of the Mach Zehnder interferoemter. It is postulated that the bias point shift is due to stresses induced by the bending.

Although only a few embodiments have been disclosed in detail above, other modifications are possible, and this disclosure is intended to cover all such modifications, and most particularly, any modification which might be predictable to a person having ordinary skill in the art. For example, the above has describes certain materials such as Su8, and epoxy such as UV 15. It should be well understood that other materials can be alternatively used in place of these materials. Moreover, while the above has described one specific way of making a Mach Zehnder interferometer, it should be understood the other types of electro optical modulators can be formed. Also, other materials can be used for the clad and core. Finally, while the above describes the modulator being flexible, it should be understood that these same techniques can be used for rigid devices.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
   forming a substrate of semiconductor material;
   forming a pattern of a second material on said substrate of semiconductor material;
   forming a flexible layer of photoresist material which has a selective adhesion characteristic whereby it selectively adheres to said semiconductor material by a different amount than which it adheres to said second material, formed over said substrate of semiconductor material, with said pattern thereon; and
   attaching a flexible electro-optic modulator to said flexible layer of photoresist material; and
   lifting said flexible layer and said flexible electro optic modulator off of said substrate, while lifting one of said materials without lifting the other of said materials.

2. A method as in claim 1, wherein said substrate is semiconductor, said second material is a metal, and said photoresist material is one which adheres to said semiconductor but does not adhere to said metal.

3. A method as if claim 2, wherein said substrate is silicon.

4. A method as in claim 3, further comprising forming pigtails of silicon at ends of the flexible layer of photoresist material.

5. A method as in claim 2, wherein said photoresist material is formed of SU-8.

6. The method as in claim 2, wherein said photoresist material is a material different from SU-8.

7. The method as in claim 2, wherein said substrate is a semiconductor material that is different from Si.

8. The method as in claim 2, wherein said flexible electro-optic modulator includes a first flexible electrode layer, a first flexible cladding layer formed on the first flexible electrode layer, a flexible electro-optic waveguiding layer formed on the first flexible cladding layer, a second flexible cladding layer formed on the flexible electro-optic waveguiding layer, and a second flexible electrode layer formed on the second flexible cladding layer.

9. The method as in claim 8, wherein the flexible electro-optic waveguiding layer includes two electro-optic waveguides in a Mach Zehnder configuration.

10. A method as in claim 1, further comprising dicing between multiple devices, prior to said lifting.

11. A method as in claim 1, further comprising testing different bending radii of the electro optic modulator for electrical characteristics to thereby determine characteristics for said bending radius.

12. A method as in claim 1, wherein said forming, said attaching and said lifting, are each carried out at a temperature greater than 150° C.

13. The method as in claim 1, comprising:
subsequent to the lifting step, attaching said flexible layer and said flexible electro-optic modulator to a curved surface of a device.

14. The method as in claim 13, comprising:
providing electrical control to the flexible electro-optic modulator attached to the curved surface of the device to enable optical modulation.

15. The method as in claim 13, wherein the curved surface of the device is plastic.

16. The method as in claim 13, wherein the curved surface of the device is made of Si.

17. The method as in claim 13, wherein the curved surface of the device is made of GaAs.

18. The method as in claim 13, wherein the device is part of a photonic system.

19. The method as in claim 13, wherein the device is part of an optically controlled antennas.

20. The method as in claim 13, wherein the device is part of an optical signal processing device.

21. The method as in claim 13, wherein the curved surface is an aircraft surface.

22. The method as in claim 13, wherein the device is part of an optically controlled phased array antennas.

23. The method as in claim 1, wherein the flexible electro-optic modulator comprises a flexible electro-optic polymer material.

24. A method comprising:
using a photoresist material that has a selective liftoff characteristics, whereby it adheres to one material more than it adheres to another material, as a support for an electro-optic polymer modulator that includes both said one material and said another material.

25. The method as in claim 24, comprising:
lifting the electro-optic polymer modulator off said another material; and
attaching the electro-optic polymer modulator to a curved surface of a device.

* * * * *

UNITED STATES PATENT AND TRADEMARK OFFICE
CERTIFICATE OF CORRECTION

| | | |
|---|---|---|
| PATENT NO. | : 7,366,363 B2 | Page 1 of 1 |
| APPLICATION NO. | : 11/112870 | |
| DATED | : April 29, 2008 | |
| INVENTOR(S) | : William H. Steier et al. | |

It is certified that error appears in the above-identified patent and that said Letters Patent is hereby corrected as shown below:

At column 1, line 3, insert --CROSS-REFERENCE TO RELATED APPLICATIONS--.

At column 1, line 7, insert
 --FEDERALLY SPONSORED RESEARCH OR DEVELOPMENT
 This invention was made with government support under Contract No. F49620-01-1-0442 awarded by the Air Force Office of Scientific Research. The government has certain rights in the invention.--.

At column 4, line 47, Claim 3, delete "if" and insert --in--.

Signed and Sealed this

Tenth Day of February, 2009

JOHN DOLL
*Acting Director of the United States Patent and Trademark Office*